US011933765B2

(12) United States Patent
Lepage

(10) Patent No.: US 11,933,765 B2
(45) Date of Patent: Mar. 19, 2024

(54) ULTRASOUND INSPECTION TECHNIQUES FOR DETECTING A FLAW IN A TEST OBJECT

(71) Applicant: Evident Canada, Inc., Québec (CA)

(72) Inventor: Benoit Lepage, L'Ancienne-Lorette (CA)

(73) Assignee: Evident Canada, Inc., Québec (CA)

(*) Notice: Subject to any disclaimer, the term of this patent is extended or adjusted under 35 U.S.C. 154(b) by 187 days.

(21) Appl. No.: 17/647,537

(22) Filed: Jan. 10, 2022

(65) Prior Publication Data

US 2022/0252547 A1 Aug. 11, 2022

Related U.S. Application Data

(60) Provisional application No. 63/146,023, filed on Feb. 5, 2021.

(51) Int. Cl.
*G01N 29/06* (2006.01)
*G01N 29/04* (2006.01)
(Continued)

(52) U.S. Cl.
CPC ......... *G01N 29/069* (2013.01); *G01N 29/043* (2013.01); *G01N 29/2456* (2013.01);
(Continued)

(58) Field of Classification Search
CPC ............... G01N 29/043; G01N 29/069; G01N 29/2456; G01N 29/262; G01N 2291/0234;
(Continued)

(56) References Cited

U.S. PATENT DOCUMENTS 6,820,196 B2 * 11/2004 Kessler .............. H04N 21/8166
713/1
6,877,376 B1 4/2005 Schuster et al.
(Continued)

OTHER PUBLICATIONS

Mohseni, Ehsan, et al., "A Model-Based Study of Transmit-Receive Longitudinal Arrays for Inspection of Subsurface Defects", Journal of Nondestructive Evaluation, Diagnostics and Prognostics of Engineering Systems, vol. 3, (Aug. 2020), 8 pgs.

*Primary Examiner* — Michael B. Pierorazio
(74) *Attorney, Agent, or Firm* — Schwegman Lundberg & Woessner, P.A.

(57) ABSTRACT

Transmit-Receive Longitudinal (TRL) probes can be used for the inspection of noisy material, such as austenitic materials. By using various techniques, an inspection area is not constrained by a wedge design of an ultrasonic probe and the benefits of using a linear probe array (rather than a matrix) are maintained. Volumetric or TFM-like imaging on austenitic materials using a linear transmit array and a linear receive array that are out of plane with one another (a TRL configuration) and not in the main imaging place can simplify the inspection and analysis of such materials. For each scan position, an ultrasound probe can acquire acoustic imaging data. Then, a processor can then combine acquisitions from adjacent scan positions to create an imaging result using synthetic aperture focusing technique (SAFT) principles to recreate a focalization in a passive axis of the probe.

20 Claims, 4 Drawing Sheets

(51) Int. Cl.
  *G01N 29/24* (2006.01)
  *G01S 15/02* (2006.01)
  *G01S 15/89* (2006.01)
  *H04N 13/282* (2018.01)

(52) U.S. Cl.
  CPC .............. *G01S 15/02* (2013.01); *G01S 15/89* (2013.01); *H04N 13/282* (2018.05); *G01N 2291/0234* (2013.01)

(58) Field of Classification Search
  CPC ...... G01S 15/02; G01S 15/89; G01S 15/8913; G01S 15/8915; G01S 15/8993; G01S 15/8997; H04N 13/282
  See application file for complete search history.

(56) References Cited

U.S. PATENT DOCUMENTS

| | | | | |
|---|---|---|---|---|
| 7,375,731 B2 * | 5/2008 | Divakaran | ............. | G06F 16/785 345/581 |
| 7,606,425 B2 * | 10/2009 | Bazakos | .......... | G08B 13/19641 714/26 |
| 8,175,298 B2 * | 5/2012 | Mitani | ................ | H04N 5/60 381/74 |
| 8,201,211 B2 * | 6/2012 | Proust | .................. | G06F 21/575 707/999.203 |
| 8,351,624 B2 * | 1/2013 | Motomura | ....... | H04N 21/43635 348/706 |
| 8,769,556 B2 * | 7/2014 | Guo | ...................... | H04H 60/45 725/12 |
| 8,838,911 B1 * | 9/2014 | Hubin | ................ | H04N 21/2187 711/147 |
| 9,829,468 B2 | 11/2017 | Heinrich et al. | | |
| 10,119,942 B2 | 11/2018 | Owens et al. | | |
| 10,495,609 B2 | 12/2019 | Kim et al. | | |
| 2002/0184098 A1 * | 12/2002 | Giraud | ................ | G06V 40/165 705/14.66 |
| 2002/0186867 A1 * | 12/2002 | Gutta | ..................... | G06F 16/40 382/116 |
| 2005/0080671 A1 * | 4/2005 | Giraud | ................ | G06V 40/165 705/14.66 |
| 2006/0053342 A1 * | 3/2006 | Bazakos | .......... | G08B 13/19682 714/37 |
| 2006/0161958 A1 * | 7/2006 | Choung | ............. | H04N 21/4122 725/78 |
| 2007/0046835 A1 * | 3/2007 | Kim | ..................... | H04N 21/485 348/731 |
| 2008/0002892 A1 * | 1/2008 | Jelonek | ........... | H04N 21/25891 707/E17.026 |
| 2008/0063216 A1 * | 3/2008 | Sakata | ................ | H04S 3/008 381/80 |
| 2008/0309830 A1 * | 12/2008 | Motomura | ....... | H04N 21/43635 348/E5.122 |
| 2008/0320545 A1 * | 12/2008 | Schwartz | ........... | H04N 21/8541 725/135 |
| 2009/0012366 A1 * | 1/2009 | Wang | ...................... | A61B 1/05 600/178 |
| 2009/0116695 A1 * | 5/2009 | Anchyshkin | ........... | G06V 40/16 382/106 |
| 2009/0133051 A1 * | 5/2009 | Hildreth | ........... | H04N 21/42204 725/28 |
| 2009/0196464 A1 * | 8/2009 | Dimitrova | ............ | G06V 10/764 382/118 |
| 2009/0210902 A1 * | 8/2009 | Slaney | ............... | H04N 21/4223 725/34 |
| 2009/0217315 A1 * | 8/2009 | Malik | ................... | H04N 7/181 725/9 |
| 2009/0285454 A1 * | 11/2009 | Xu | ................... | H04N 21/44218 382/118 |
| 2010/0007726 A1 * | 1/2010 | Barbieri | ............... | G06V 40/193 348/78 |
| 2010/0008547 A1 * | 1/2010 | Yagnik | ................ | G06F 18/28 382/118 |
| 2010/0067745 A1 * | 3/2010 | Kovtun | ................. | G06V 20/40 382/106 |
| 2010/0141787 A1 * | 6/2010 | Bigioi | ................. | G06V 40/161 348/222.1 |
| 2010/0299210 A1 * | 11/2010 | Giraud | ................. | G06V 40/165 705/14.66 |
| 2010/0315553 A1 * | 12/2010 | Takatsuji | ............... | G09G 5/006 348/E9.034 |
| 2010/0321479 A1 * | 12/2010 | Yang | .................... | H04N 21/816 348/51 |
| 2010/0329081 A1 * | 12/2010 | Sullivan | ............... | G01N 29/265 175/432 |
| 2011/0033973 A1 * | 2/2011 | Cok | ...................... | C23C 14/243 118/726 |
| 2011/0051002 A1 * | 3/2011 | Oh | ......................... | H04N 5/765 348/569 |
| 2011/0052012 A1 * | 3/2011 | Bambha | ................ | G06V 40/16 382/118 |
| 2011/0068736 A1 * | 3/2011 | Chartier | .................... | H02J 7/00 320/137 |
| 2011/0113442 A1 * | 5/2011 | Kikkawa | ................ | G09G 5/006 725/25 |
| 2011/0129126 A1 * | 6/2011 | Begeja | .................. | G06F 16/784 382/118 |
| 2011/0134338 A1 * | 6/2011 | Toba | ...................... | H04N 5/765 348/734 |
| 2011/0142245 A1 * | 6/2011 | Toba | ...................... | H04N 21/436 381/22 |
| 2011/0150295 A1 * | 6/2011 | Eckhoff | ................. | G06Q 30/02 382/118 |
| 2011/0150296 A1 * | 6/2011 | Eckhoff | ................. | G06Q 30/02 382/118 |
| 2011/0150297 A1 * | 6/2011 | Eckhoff | ................. | G06V 40/172 382/118 |
| 2011/0150298 A1 * | 6/2011 | Eckhoff | ................. | G06Q 30/02 382/118 |
| 2011/0150299 A1 * | 6/2011 | Eckhoff | ................. | G06Q 30/02 382/118 |
| 2011/0176057 A1 * | 7/2011 | Okamura | ............... | H04N 21/439 348/554 |
| 2011/0231757 A1 * | 9/2011 | Haddick | .................. | H04N 23/55 715/702 |
| 2011/0234916 A1 * | 9/2011 | Fujita | ...................... | H04N 5/60 348/E5.122 |
| 2012/0002562 A1 * | 1/2012 | Kawade | ................ | H04N 5/765 370/252 |
| 2012/0030728 A1 * | 2/2012 | Yukawa | ................. | G06F 9/44 725/151 |
| 2012/0042346 A1 * | 2/2012 | Yoshida | ............... | H04N 21/4363 725/81 |
| 2012/0136612 A1 * | 5/2012 | Vanderhoff | .......... | H04N 17/004 702/119 |
| 2012/0188456 A1 * | 7/2012 | Kuroyanagi | ........... | H04N 5/765 348/731 |
| 2012/0307157 A1 * | 12/2012 | Utsunomiya | .... | H04N 21/43622 348/707 |
| 2013/0021536 A1 * | 1/2013 | Kamida | ............... | H04N 21/43622 348/739 |
| 2013/0051578 A1 * | 2/2013 | Chu | ........................ | H04B 1/123 381/94.1 |
| 2013/0051584 A1 * | 2/2013 | Higuchi | ............... | H04N 21/8106 381/123 |
| 2013/0079639 A1 | 3/2013 | Hoctor et al. | | |
| 2013/0111509 A1 * | 5/2013 | Guo | ...................... | H04H 60/45 725/12 |
| 2013/0223538 A1 * | 8/2013 | Wang | ............... | H04N 21/43637 375/E7.027 |
| 2013/0292311 A1 * | 11/2013 | Shaw | ...................... | E03F 5/042 137/15.01 |
| 2014/0193134 A1 * | 7/2014 | Maeda | ............. | H04N 21/43072 386/231 |
| 2015/0077633 A1 * | 3/2015 | Lee | .................... | H04N 21/4392 348/515 |
| 2015/0157194 A1 * | 6/2015 | Okuda | .................... | A61B 1/00197 600/109 |

(56) References Cited

U.S. PATENT DOCUMENTS

| | | | |
|---|---|---|---|
| 2016/0029879 A1* | 2/2016 | Ishikawa | A61B 1/005 600/110 |
| 2016/0150945 A1* | 6/2016 | Okamoto | A61B 1/00101 600/114 |
| 2017/0196537 A1* | 7/2017 | Saiga | A61B 8/461 |
| 2018/0092627 A1* | 4/2018 | Susumu | A61B 8/4494 |
| 2018/0132827 A1* | 5/2018 | Nakanishi | G01S 15/8925 |
| 2019/0388998 A1 | 12/2019 | Huggett et al. | |
| 2020/0151513 A1* | 5/2020 | Lee | G06V 10/764 |
| 2020/0209195 A1 | 7/2020 | Kitazawa et al. | |
| 2020/0345330 A1* | 11/2020 | Zhang | G06T 7/0012 |
| 2021/0116421 A1* | 4/2021 | Vrana | G01N 29/11 |
| 2021/0278370 A1* | 9/2021 | Borigo | G01N 29/265 |
| 2021/0341436 A1* | 11/2021 | Perdios | G01N 29/043 |
| 2022/0050084 A1* | 2/2022 | Panzer | G01N 29/262 |
| 2022/0170888 A1* | 6/2022 | Shoji | G01N 29/11 |
| 2022/0280136 A1* | 9/2022 | Yuchi | G01S 15/8927 |
| 2022/0290967 A1* | 9/2022 | Reeves | G01B 7/105 |
| 2022/0291174 A1* | 9/2022 | Hirao | G01N 29/265 |
| 2022/0326191 A1* | 10/2022 | Shimomukai | G01N 29/043 |
| 2022/0334088 A1* | 10/2022 | Shinoda | G01N 29/069 |
| 2022/0341879 A1* | 10/2022 | Kraljic | G01N 29/2437 |
| 2022/0341886 A1* | 10/2022 | David | G01N 29/265 |
| 2022/0341892 A1* | 10/2022 | David | G01N 29/043 |
| 2022/0381741 A1* | 12/2022 | Nagai | G01N 29/26 |
| 2023/0079884 A1* | 3/2023 | Yamamoto | G01N 29/11 600/459 |
| 2023/0098406 A1* | 3/2023 | Le Duff | G01S 15/8915 704/500 |
| 2023/0200635 A1* | 6/2023 | Ishizuka | A61B 1/051 348/65 |

* cited by examiner

ULTRASOUND INSPECTION TECHNIQUES FOR DETECTING A FLAW IN A TEST OBJECT

CLAIM OF PRIORITY

This application claims the benefit of priority of U.S. Provisional Patent Application Ser. No. 63/146,023, titled "ULTRASOUND INSPECTION TECHNIQUES FOR DETECTING A FLAW IN A TEST OBJECT" to Benoit Lepage, filed on Feb. 5, 2021, the entire contents of which being incorporated herein by reference.

FIELD OF THE DISCLOSURE

This document pertains generally, but not by way of limitation, to non-destructive evaluation using acoustic techniques.

BACKGROUND

Various techniques can be used to perform inspection of structures in a non-destructive manner. Such techniques can include use of ionizing radiation such as X-rays for inspection, electromagnetic techniques such as eddy-current techniques, or acoustic techniques, as illustrative examples. In one approach, an ultrasonic transducer or an array of such transducers can be used to inspect a structure using acoustic energy. Ultrasonic inspection is useful for inspection of a variety of different structures including bar-shaped or tubular structures, welds, planar (e.g., plate materials), and composite materials such as carbon-fiber reinforced composite structures.

Inhomogeneities on or within the structure under test can generate scattered or reflected acoustic signals in response to a transmitted acoustic pulse. Such acoustic "echoes" can be received and processed. Such processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

SUMMARY OF THE DISCLOSURE

This disclosure describes techniques for simplifying the inspection and improving the analysis of austenitic materials. Transmit-Receive Longitudinal (TRL) probes can be used for the inspection of noisy material, such as austenitic materials. By using various techniques, an inspection area is not constrained by a wedge design of an ultrasonic probe and the benefits of using a linear probe array (rather than a matrix) are maintained. Volumetric or TFM-like imaging on austenitic materials using a linear transmit array and a linear receive array that are out of plane with one another (a TRL configuration) and not in the main imaging place can simplify the inspection and analysis of such materials. For each scan position, an ultrasound probe can acquire acoustic imaging data. Then, a processor can then combine acquisitions from adjacent scan positions to create an imaging result using synthetic aperture focusing technique (SAFT) principles to recreate a focalization in a passive axis of the probe.

In some aspects, this disclosure is directed to an ultrasound inspection method for detecting a flaw in a test object and generating an image of the flaw, the method comprising: defining an aperture for emulation using a synthetic aperture focusing technique; and for corresponding ones of a plurality of scan positions in the defined aperture: acquiring, using an ultrasonic probe assembly, acoustic imaging data of the test object; determining partial imaging result data using the acquired acoustic imaging data; and generating complete imaging result data using the partial imaging results data from each scan position.

In some aspects, this disclosure is directed to an ultrasound inspection system configured to detect a flaw in a test object and generate an image of the flaw, the system comprising: an ultrasonic probe assembly; and a processor configured to: define an aperture for emulation using a synthetic aperture focusing technique; and for corresponding ones of a plurality of scan positions in the defined aperture: acquire, using the ultrasonic probe assembly, acoustic imaging data of the test object; determine partial imaging result data using the acquired acoustic imaging data; and generate complete imaging result data using the partial imaging results data from each scan position.

In some aspects, this disclosure is directed to an ultrasound inspection system configured to detect a flaw in a test object and generate an image of the flaw, the system comprising: an ultrasonic probe assembly having a linear transmit array and a linear receive array; and a processor configured to: define an aperture for emulation using a synthetic aperture focusing technique; and for corresponding ones of a plurality of scan positions in the defined aperture: acquire, using the ultrasonic probe assembly, full matrix capture (FMC) data of the test object; determine partial total focusing method (TFM) data using the acquired acoustic imaging data; and generate a TFM image using the partial TFM data from each scan position.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
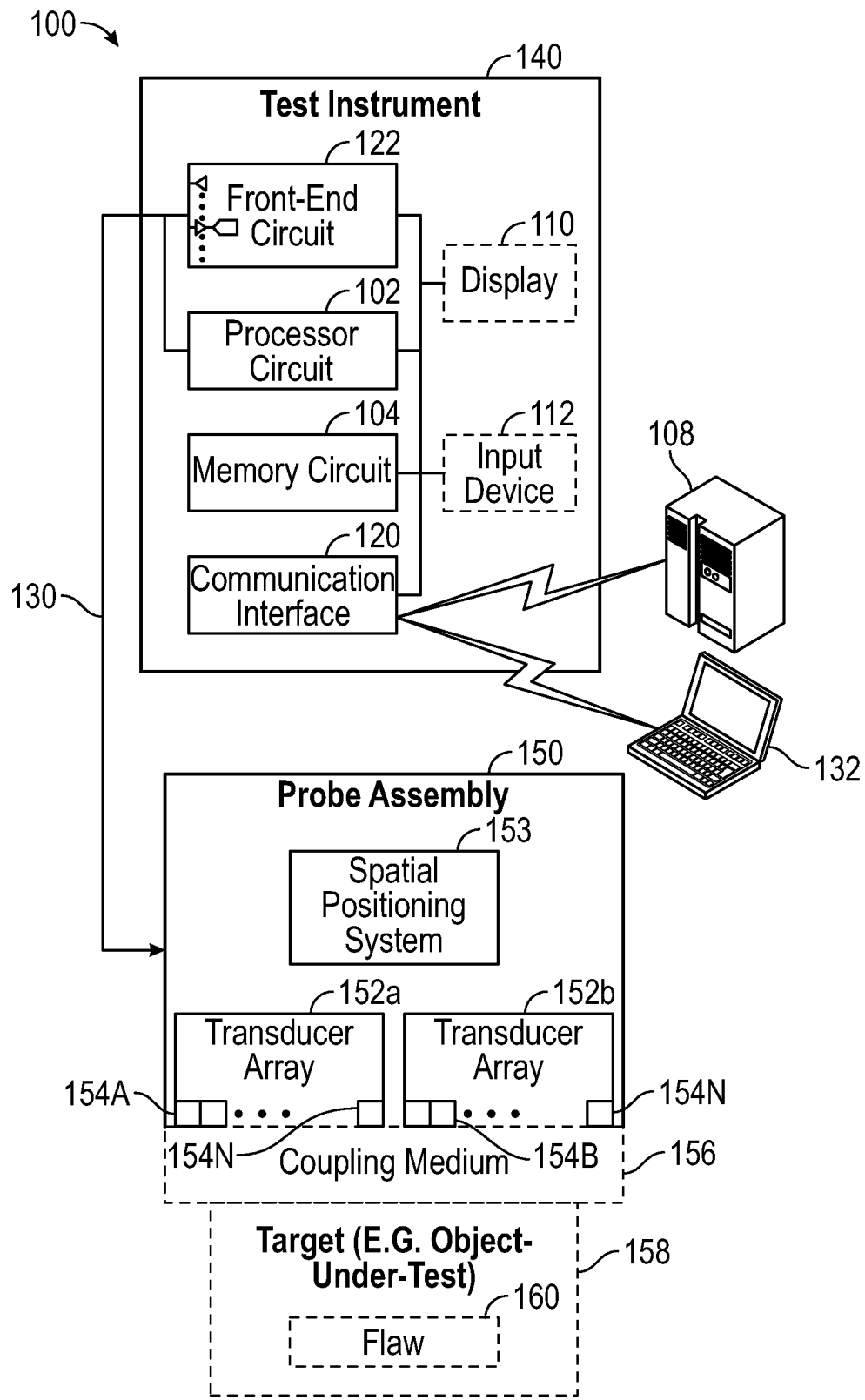
FIG. 1 illustrates generally an example of an acoustic inspection system, such as can be used to perform one or more techniques described herein.

As mentioned above, acoustic techniques can be used to perform non-destructive testing (sometimes referred to generally as non-destructive inspection) of structures by coupling acoustic energy onto or within such structures and detecting scattered or reflected energy corresponding to features on or within such structures under test.

The hallmark of ultrasonic phased array is the capacity to focus and steer an acoustic beam at a desired position in an inspected object or part. The phased array focusing approach uses delays, applied on both the transmission and reception elements of the phased array probe, to synchronize the time of flights of short, pulsed waveforms at the position of interest. At the focal zone in the specimen, the width of the generated acoustic beam narrows, and the corresponding detection resolution increases.

Conventional phased array uses the physical superposition of elementary acoustic waves in transmission to produce an acoustic beam aimed at a specific focused depth in the inspected piece. The set of transmitter elements form an aperture from which a coherent acoustic pulse emerges. The action of conventional phased array transmission is referred to as beamforming. In an S-scan, for instance, beamforming acquisition occurs for each user-specified angle. An S-scan can be produced when a phased array electronically sweeps an ultrasonic beam through a range of angles. The resulting data can be displayed as an image that shows the angular segment covered by the beam.

In one approach, a plurality of acoustic transducers can be used to perform such acoustic inspection. Such a plurality of transducers can be referred to as an "array".

Processing of received acoustic echo signals to form images can involve various techniques. In one acoustic acquisition approach, respective received acoustic echo signals can be "delayed and summed" to provide focusing within the structure under test.

In another approach, an acoustic acquisition technique called a "total focusing method" (TFM) can be used, such as involving a full-matrix capture (FMC) acquisition scheme where focus can be achieved across a broad spatial region on or within a structure under test. TFM also uses a delay-and-sum algorithm. Several TFM propagation modes are available, where the TFM propagation modes represent the path of ultrasound waves from the transmitter to an image pixel in a TFM zone and back to the receiver (including reflections).

The TFM acoustic propagation modes are defined by the types of waves (transverse or longitudinal) for each leg of the path. A pulse-echo mode is any propagation mode where the transmitted beam and the reception beam follow the exact same path in the inspected piece. Pulse-echo modes can be achieved in a direct path with no skips, such as TT, or with multiple skips, e.g., TT-TT. In a self-tandem mode, e.g., TT-T, the transmission and reception propagation paths do not match exactly, but the transmitting and receiving elements are on the same phased array probe.

The TFM algorithm is a form of dimensionality reduction, where acoustic data, typically arranged into a full matrix capture (FMC) matrix (typical size is 1024×4000 or greater) are summed using predefined generation parameters to form an image. A typical size of a TFM image can be 1024×1024 pixels or less.

Various generation parameters can be used to generate an image, such as a TFM image. For example, generation parameters can include wedge velocity, wedge angle, wedge first elements height, wedge radius, part velocity, part thickness, and/or the selected acoustic propagation mode(s).

To produce a pixel or voxel in an acoustic image of an object using TFM, for example, a processor can calculate the delays associated with that pixel or voxel using the acoustic data, such as data from an FMC matrix, that was acquired by the acoustic imaging system using one or more of the generation parameters. The processor can determine the amplitude at the particular delay, generate a scattering matrix (hereafter "S-matrix"), and then generate an image of the material being inspected. Each combination element-voxel has an associated delay. These delays can be used to determine the relevant data in the full matrix of acoustic data. The "particular delay" represents the delay needed for a specific combination of elements and pixel/voxel. The S-matrix, once summed by TFM, can be used by the processor to produce a pixel or voxel to generate an image.

Some materials are more challenging to inspect with NDT techniques than other materials. For example, noisy materials, such as austenitic materials, can be hard to inspect due to their complex acoustic properties. As an example, pipes or conduits made of regular carbon steel and internally clad with a corrosion resistant alloy can be joined by austenitic material. Corrosion resistant alloys and weld material can be very similar austenitic materials with high nickel and chrome content.

The austenitic structure, with its coarse and orientated grains, can cause inspection issues that can worsen with the addition of cladding. For example, energy can be scattered on the grains, which reduces the signal-to-noise ratio. In addition, other issues can include beam skewing and distortion, especially for (vertically polarized) shear waves. Finally, local variations of the metal structure (structural anisotropy) can induce local variations of ultrasonic test propagation properties (attenuation, sound velocity, refracted angles).

For noisy materials, such as austenitic material, it can be challenging to obtain adequate focalization in the full inspection area using a linear probe with a Transmit-Receive Longitudinal (TRL) configuration. For example, adequate focalization can be obtained in a limited area provided that the wedge angle of the probe is precisely cut for the application. As an alternative, an expensive, high element count array probe can be used to inspect noisy materials.

The present inventor has recognized a need to simply the inspection and improve the analysis of austenitic materials. For example, the present inventor has recognized the need for using Transmit-Receive Longitudinal (TRL) probes for the inspection of noisy material, such as austenitic materials. By using various techniques of this disclosure, the inspection area is not constrained by the wedge design of a probe and the benefits of using a linear probe array (rather than a matrix) are maintained. As such, these techniques can result in a lower probe cost, a lower electronic cost, an ability to match frequency and pitch of existing dual linear array (DLA) probes, and a faster acquisition than matrix probes for FMC acquisition (due to fewer elements).

In accordance with various techniques of this disclosure, the present inventor has recognized that volumetric or TFM-like imaging on austenitic materials using an ultrasonic probe assembly including a transmit array and a receive array that are out of plane with one another and not in the main imaging place can simplify the inspection and analysis of such materials. In some examples, a probe assembly including a linear transmit array and a linear receive array, e.g., a TRL configuration with a single active axis. The linear transmit array and the linear receive array can use linear probes having elements with a relatively small elevation with respect to the ultrasound wavelength to produce a divergent beam along the scan axis.

In other examples, an ultrasonic probe assembly having a matrix probe that has a limited size in the elevation axis can be used, such as less than a wavelength of the generated ultrasound signal in the coupling medium, e.g., about half of the wavelength. For example, various techniques of this disclosure can be implemented using two 2×16 element matrix probes.

As described in more detail below, for each scan position, an ultrasound probe, such as having a linear transmit array and a linear receive array, can acquire acoustic imaging data, e.g., FMC data, plane wave data, half matrix capture (HMC) data, or virtual source aperture (VSA) data. Then, a processor can then combine acquisitions from adjacent scan positions to create an imaging result, e.g., TFM image, using synthetic aperture focusing technique (SAFT) principles to recreate a focalization in a passive axis of the probe.

In SAFT, the transmitted beam is a broad band signal which is sent out in a wide cone of transmission, which can be achieved by a small elevation of the probe elements, such as around half of the wavelength in the wedge of the probe. The broadband nature of the transmitted signal allows direct measurement of the time of flight (TOF) or the phase information of the signal, thereby allowing the determination of the range of any reflectors (e.g., changes in acoustical impedance) which cause returning echoes. Moreover, the wide cone transmission beam in SAFT allows recording on one receiver channel of echoes returning from all directions. This can provide information about an entire area, eliminating the need to scan the area point by point. However, since one receiver channel cannot determine the direction from which the echoes have come, SAFT requires the use of many receiver channels. By comparing information across the channels, the direction of the returning signal can be determined. This process enables focusing on a point by analyzing the receiver traces and is thus referred to as synthetic focusing.

FIG. 1 illustrates generally an example of an acoustic inspection system 100, such as can be used to perform one or more techniques described herein. The acoustic inspection system 100 of FIG. 1 is an example of an acoustic imaging modality, such as an acoustic phased array system, that can implement various techniques of this disclosure.

The inspection system 100 can include a test instrument 140, such as a hand-held or portable assembly. The test instrument 140 can be electrically coupled to a probe assembly, such as using a multi-conductor interconnect 130. The electrical coupling can be a wired connection or a wireless connection. The probe assembly 150 can include two or more electroacoustic transducers, such as a transducer arrays 152A, 152B, each including respective transducers 154A through 154N. The transducer array 152A can be a transmit probe, such as the transmit probe 302 of FIG. 3, and the transducer array 152B can be a receive probe, such as the receive probe 304 of FIG. 3. The transducer arrays can follow a linear or curved contour or can include an array of elements extending in two axes, such as providing a matrix of transducer elements. The elements need not be square in footprint or arranged along a straight-line axis. Element size and pitch can be varied according to the inspection application.

In some examples, the probe assembly 150 can include a spatial positioning system 153, e.g., an encoder or device to implement encoder-like functions. The spatial positioning system 153, such as a Mini-Wheel™ encoder available from Olympus (https://www.olympus-ims.com/en/scanners/mini-wheel/), can trigger acquisition of the acoustic imaging data every acquisition step, e.g., about 1 mm as a non-limiting example, which can result in consistent data acquisition.

A modular probe assembly 150 configuration can be used, such as to allow a test instrument 140 to be used with various probe assemblies 150. In a non-limiting example, the transducer arrays 152A, 152B can include piezoelectric transducers, such as can be acoustically coupled to a target 158 (e.g., an object under test) through a coupling medium 156.

In other examples, capacitive micromachined ultrasonic transducer (CMUT) arrays can be used. The coupling medium can include a fluid or gel or a solid membrane (e.g., an elastomer or other polymer material), or a combination of fluid, gel, or solid structures. For example, an acoustic transducer assembly having a TRL configuration, such as the probe 300 in FIG. 3. The probe assembly 300 can include a transmit probe 302 and a receive probe 304 that have corresponding wedges that are acoustically insulated from one another, such as by using cork. The wedge structures can include a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

Although FIG. 1 shows a single probe assembly 150, other configurations can be used, such as multiple probe assemblies connected to a single test instrument 140. Similarly, a test protocol can be performed using coordination between multiple test instruments 140, such as in response to an overall test scheme established from a master test instrument 140, or established by another remote system such as a computing facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit 102 can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a computing facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of data or intermediate data such as A-line matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

The acoustic inspection system 100 can acquire acoustic data, such as using FMC, half matrix capture (HMC), virtual source aperture (VSA), or plane wave imaging, of a material using an acoustic acquisition technique, such as an acoustic phased array system. The processor circuit 102 can then generate an acoustic data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

To generate an image, an acoustic inspection system, such as the acoustic inspection system 100 of FIG. 1, can use inspection parameters and generation parameters. Inspection parameters need to be known, such as by being input by an operator before a scan begins, without regards to the final acoustic image to be generated. Inspection parameters can include the following: A-scan start (time at the first sample data), sample time resolution, frequency of probe, number of element in probe, and other characteristic of the probe such as element size, pitch, and bandwidth.

Generation parameters and many inspection parameters are used to generate an acoustic image from the acoustic data. Generation parameters can include selected acoustic mode, thickness of part, velocity (velocity of different mode in the inspection (wedge, part), and a region of interest, (size, position, and/or resolution). An acoustic image, such as a TFM image, can be generated using at least one generation parameter and first acoustic data, such as FMC data, where the first acoustic data can be acquired at least in part by an acoustic acquisition technique, such as an acoustic phased array system.

Figure 2:
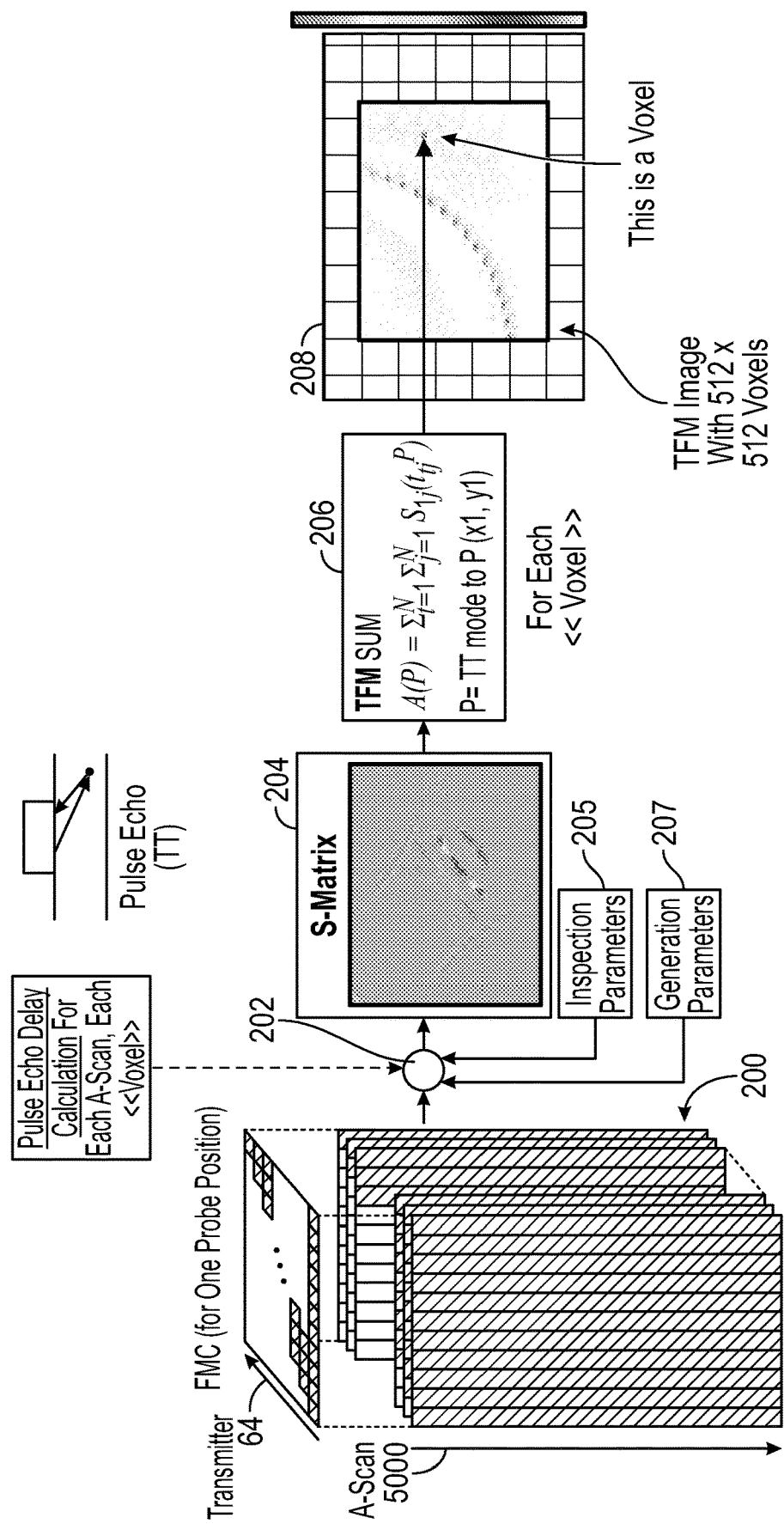
FIG. 2 is a conceptual diagram illustrating a non-limiting example of total focusing method.

FIG. 2 is a conceptual diagram illustrating a non-limiting example of total focusing method. Starting on the left-hand side, an acoustic inspection system, such as the acoustic inspection system 100 of FIG. 1, can include 64 elements, where all elements transmit and then receive, which generates a matrix of A-scans that constitute the FMC data 200. These 64 transmit and 64 receive elements provide a plurality of transmit and receive channels that can be selected by a processor, such as the processor 102 of FIG. 1. In this non-limiting example, a pulse echo direct (TT) propagation mode was used. In other examples, self-tandem (TT-T), pulse echo with skip (TT-TT), or other propagation modes can be used.

Figure 3:
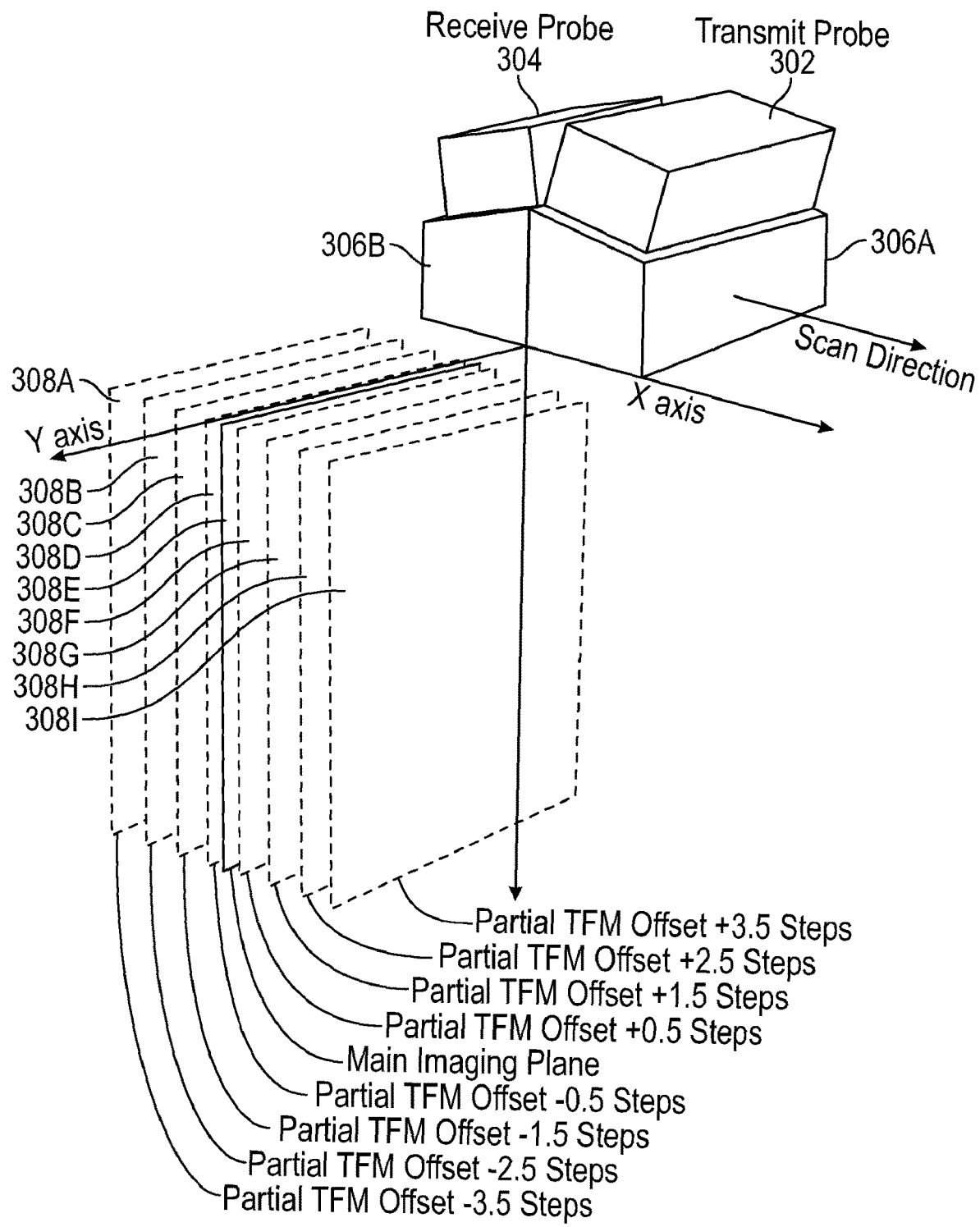
FIG. 3 is a conceptual diagram depicting an ultrasonic probe assembly and a plurality of imaging planes that can be used to produce an imaging result using various techniques of this disclosure.

It should be noted that, in some examples, the techniques of this disclosure do not require a matrix probe, such as shown in FIG. 2. Rather, to expedite processing of signals, an ultrasonic probe having a linear transmit array, e.g., 1×16 array, and a linear receive array, e.g., 1×16 array, can be used, such as shown in FIG. 3. These 16 transmit and 16 receive elements provide a plurality of transmit and receive channels that can be selected by a processor, such as the processor 102 of FIG. 1. By firing only 16 elements, the assembly can process fewer signals, resulting a faster scan speed. In some examples, each individual transmit and receive can generate an A-scan and an FMC can be obtained to include one or more of the generated A-scans.

Various inspection parameters 205 and generation parameters 207 can be used to perform the delay calculation at 202, e.g., a pulse echo delay calculation. For example, generation parameters 207 can include wedge velocity, wedge angle, wedge first elements height, wedge radius, part velocity, part thickness, and/or the selected acoustic propagation mode(s). Inspection parameters can include A-scan start (time at the first sample data), sample time resolution, frequency of probe, number of element in probe, and other characteristic of the probe such as element size, pitch, and bandwidth of the probe.

A processor circuit, such as the processor circuit 102 of FIG. 1, can calculate a delay for each A-scan and for each pixel or voxel, such as a pulse echo delay, using the inspection parameters 205 and generation parameters 207. The processor circuit can generate an S-matrix data set 204 that includes amplitude information and the corresponding delay data (or phase data) for each pixel or voxel. The processor circuit can perform a TFM summation 206 on the S-matrix data set, where each voxel of the TFM image has a different corresponding S-matrix, and generate a single pixel or voxel in an image 208 of the material under test.

FIG. 3 is a conceptual diagram depicting an ultrasonic probe assembly and a plurality of imaging planes that can be used to produce an imaging result using various techniques of this disclosure. The probe assembly 300 can be an example of the probe assembly 150 of FIG. 1.

In some examples, the probe assembly 300 can include a transmit probe 302 and a receive probe 304. In some examples, the transmit probe 302 can include a linear transmit array and the receive probe 304 can include a linear receive array. The transmit probe 302 is positioned on a wedge 306A and the receive probe 304 is positioned on a wedge 306B.

In some examples, the probe assembly can include a Transmit-Receive-Longitudinal (TRL) probe. TRL probes can use separate transmit and receive elements and generate refracted longitudinal waves rather than shear waves.

In some examples, the transmit probe and receive probe can be offset relative to a main imaging plane. For many inspection configurations that use linear array probes, the probe element position can be described only by their y, z coordinates because the x probe element equals the imaging plane x. However, for TRL probes, there can be an x offset relative to the main imaging plane.

The probe assembly 300 can include an x-axis, which can also be the scan direction, and a y-axis that is perpendicular to the x-axis. A beam from the ultrasonic probe assembly can be steered along its primary axis, which is represented by the y-axis in FIG. 3. In accordance with various techniques of this disclosure and using SAFT principles, an aperture size can be emulated in the secondary axis, which is represented by the x-axis in FIG. 3. SAFT is signal processing technique that can take advantage of the movement of a small conventional transducer to simulate, in effect, a phased array that is extremely long.

In the conceptual, non-limiting example shown in FIG. 3, nine imaging planes are shown, labeled 308A-308I. In other examples, more than nine, or less than nine, imaging planes can be used. The imaging planes 308A-308I can include a main imaging plane 308E. The imaging planes 308A-308D, 308F-308I are offset from the main imaging plane 308, such as by a fixed distance.

Using the techniques of this disclosure, a user, for example, can determine an aperture for emulation, such as using SAFT. For example, the user can input the aperture or the aperture can otherwise be obtained. The aperture can be a fixed distance, for example, and include a plurality of imaging planes. Then, for corresponding ones of a plurality of scan positions in the determined aperture, a processor of an acoustic inspection system, such as the processor 102 of the acoustic inspection system 100 of FIG. 1, can acquire, such as using an ultrasonic probe assembly having a linear transmit array and a linear receive array, acoustic imaging data of the test object, such as FMC data, HMC data, VSA data, plane wave data. The processor can then determine partial imaging result data using the acquired acoustic imaging data. A processor, such as the processor 102 of FIG. 1, can generate complete imaging result data using the partial imaging results data from each scan position.

Using these techniques, the acoustic inspection system can produce complete imaging result data, such as complete TFM data, in the main imaging plane 308E using partial imaging result data, such as partial TFM data, from the other imaging planes 308A-308D, 308F-308I. The processor can determine the partial imaging result data from the corresponding imaging planes 308A-308D, 308F-308I using their corresponding offsets. The processor can use the complete imaging result data, such as complete TFM data, to generate an image of the material, such as a TFM representation. In some examples, the image can be a three-dimensional (3D) image, such as a 3D TFM image. The techniques are shown and described in more detail below with respect to FIG. 4.

Figure 4:
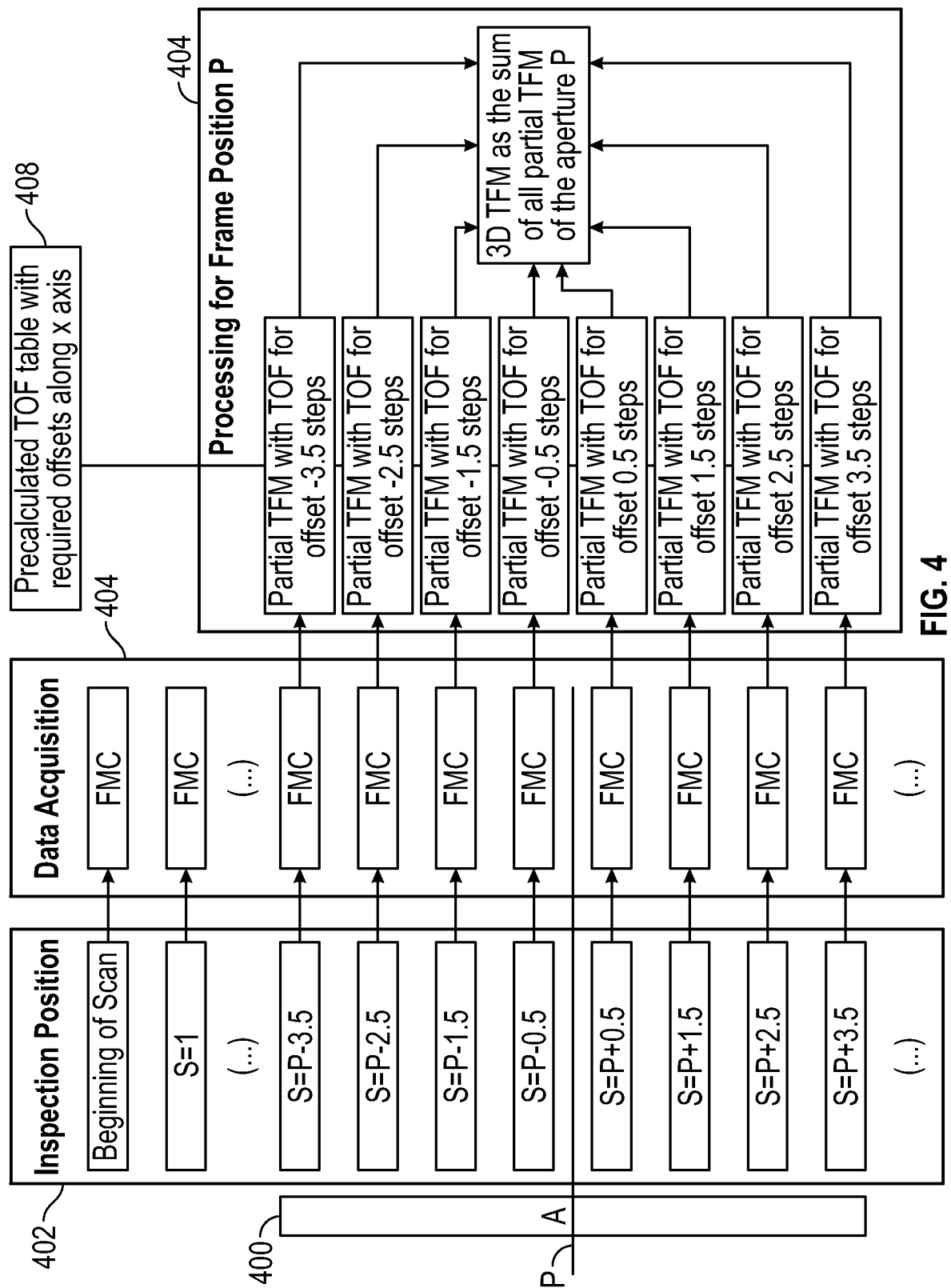
FIG. 4 is a block diagram and depicts how complete imaging result data is obtained using various techniques of this disclosure.

FIG. 4 is a block diagram and depicts how complete imaging result data is obtained using various techniques of this disclosure. A defined aperture 400 is shown in FIG. 4. The aperture can be defined by a user, for example, and can be a fixed distance. Various inspection positions for the ultrasonic probe, such as the ultrasonic probe assembly 150 of FIG. 1, are shown in block 402. In block 402, S represents the acquisition step, e.g., one acquisition per millimeter, and P represents the position of the main imaging plane. The aperture for emulation using SAFT can be defined by a number of acquisition steps and a size of the acquisition step.

As seen in block 402, the acquisition steps S are offset from the main imaging plane P, e.g., S=P−3.5, S=P−2.5, S=P−1.5, and so forth. Each of the acquisition step S positions and the main imaging plane P represent the imaging planes 308A-308I of FIG. 3. It should be noted that integer offsets can also be used.

Conceptually, the aperture 400 slides downward in FIG. 4 as the ultrasound probe is moved, and the position of the main imaging plane P slides downward along with the aperture. Initially, the aperture 400 would be at the top and the inspection position "beginning of scan" in block 402 would be included in the aperture 400, along with the inspection position "S=1", and the main imaging plane P would be shifted upward by a corresponding distance.

Acoustic imaging data acquisition is shown in block 404. Although labeled as FMC data in FIG. 4, the acoustic imaging data can include plane wave data, half matrix capture (HMC) data, or virtual source aperture (VSA) data. At corresponding inspection positions 402 (also referred to as "scan positions"), the acoustic inspection system, such as the acoustic inspection system 100 of FIG. 1, can acquire, using an ultrasonic probe assembly having a linear transmit array and a linear receive array, acoustic imaging data of the test object.

For example, as shown in FIG. 4, the inspection position S=P−3.5 is at the top of the aperture 400 (and ready to slide out of the aperture) and the inspection position S=P+3.5 is at the bottom of the aperture. The acoustic inspection system can acquire the acoustic imaging data 404, e.g., FMC data, at all of the positions within the defined aperture 400, such as S=P−3.5 through S=P+3.5. No acquisition is done at the position of the main imaging plane P. Rather, it is where an image is produced.

In some examples, the inspection positions can be at fixed, and known, distances with respect to each. A fixed, and known, distance between acquisitions is highly desirable to avoid the need to recompute the TOF (the fixed acquisition spatial frequency enables the use of precalculated delays). The acoustic inspection system can acquire the acoustic imaging data 404 by adjusting the position of the ultrasonic probe using a fixed sequence of the scan positions. In other words, in some examples, the acoustic inspection system can acquire the acoustic imaging data 404 in fixed acquisition steps. As mentioned above, the probe assembly, such as the probe assembly 150 of FIG. 1, can include a spatial positioning system 153, e.g., an encoder, that can trigger acquisition of the acoustic imaging data every acquisition step, e.g., every 1 mm, which can result in consistent data acquisition.

Then, at each inspection position 402 or "scan position", the acoustic inspection system can determine partial imaging result data using the acquired acoustic imaging data, such as from S=P−3.5 through S=P+3.5. The processing for the position of the main imaging plane P is shown in block 404. A processor, such as the processor 102 of FIG. 1, can determine partial imaging result data using the acquired acoustic imaging data. Imaging result data can be "partial" because it can lack focalization in a particular axis. For example, TFM data can be partial TFM data when it lacks focalization in the elevation axis.

For inspection position S=P−3.5, for example, the processor can use the acoustic imaging data, e.g., FMC data, acquired for that inspection position, to determine partial imaging result data 406, e.g., partial TFM data, with a time-of-flight (TOF) offset that corresponds to −3.5 steps. For example, TOF offset values 408 can be stored in a memory circuit, such as the memory circuit 104 of FIG. 1, and retrieved by the processor. The TOF offset values, or delays, are determined to match the position of the main imaging plane P. That is, the ultrasound probe, such as the transmit probe 302 of FIG. 3 and the receive probe 304 of FIG. 3, can be offset relative to the main imaging plane P and the TOF delays can be calculated based on the offset. As shown in FIG. 4, the processor can determine partial imaging result data for corresponding ones of the scan positions within the defined aperture.

Then, the processor can generate complete imaging result data, e.g., a complete TFM representation, using the partial imaging results data from the scan positions. For example, in FIG. 4, a TFM representation, such as a TFM image can be generated as the sum of all the partial TFM data in the aperture 400. That is, the processor can sum the partial TFM data corresponding to the scan positions S=P−3.5 through S=P+3.5 on a voxel-by-voxel basis to generate a complete TFM image at the imaging plane P. In this manner, the processor can select the acoustic imaging data sets of interest, e.g., 8 sets of FMC data in FIG. 4, that are defined by the aperture 400, which the processor can use to generate an image that will be aligned in the center of secondary axis aperture 400 (x-axis in FIG. 3), which is the main imaging plane P.

As the aperture 400 moves over the test object, or "slides" downward in FIG. 4, the acoustic imaging data, e.g., FMC data, acquired at a particular inspection position will be used again, but with a different TOF delays due to the change in offset between the inspection position and the position of the main imaging plane P. For example, as the aperture 400 conceptually slides downward in FIG. 4, the inspection position S=P−2.5 moves one step further away from the main imaging plane P shown in FIG. 4 and, as such, becomes the inspection position S=P−3.5. The processor can apply a new TOF delay to the FMC data previously acquired at the previous inspection position S=P−2.5 and generates a new partial TFM. In this manner, as the probe moves, the processor can use the acquired acoustic imaging data multiple times, each time with a different delay, to generate corresponding images at the corresponding main imaging planes.

Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. An ultrasound inspection method for detecting a flaw in a test object and generating an image of the flaw, the method comprising:
    defining an aperture for emulation using a synthetic aperture focusing technique; and
    for corresponding ones of a plurality of scan positions in the defined aperture:
        acquiring, using an ultrasonic probe assembly having a linear transmit array and a linear receive array, acoustic imaging data of the test object;
        determining partial imaging result data using the acquired acoustic imaging data; and
        generating complete imaging result data using the partial imaging results data from each scan position.

2. The method of claim 1, comprising:
    generating a three-dimensional (3D) image using the complete imaging result data.

3. The method of claim 1, wherein generating complete imaging result data using the partial imaging results data from each scan position includes:
    generating a three-dimensional image in a main imaging plane, and
    wherein determining the partial imaging result data using the acquired acoustic acquisition data includes:
    determining the partial imaging result data using corresponding imaging planes that are offset relative to the main imaging plane.

4. The method of claim 3, wherein determining the partial imaging result data using corresponding inspection planes that are offset relative to the main imaging plane includes:
    applying a time-of-flight (TOF) delay to the partial imaging result data for each corresponding imaging plane.

5. The method of claim 1, comprising:
adjusting the position of the ultrasonic probe assembly using a fixed sequence of the scan positions.

6. The method of claim 1, wherein defining the aperture for emulation using the synthetic aperture focusing technique includes:
defining a number of acquisition steps and a size of the acquisition step.

7. The method of claim 1, wherein the acoustic imaging data includes full matrix capture (FMC) data.

8. The method of claim 1, wherein the acoustic imaging data includes plane wave data.

9. The method of claim 1, wherein the partial imaging result data includes partial total focusing method (TFM) data, and wherein the complete imaging result data includes complete TFM data.

10. An ultrasound inspection system configured to detect a flaw in a test object and generate an image of the flaw, the system comprising:
an ultrasonic probe assembly having a linear transmit array and a linear receive array; and
a processor configured to:
define an aperture for emulation using a synthetic aperture focusing technique; and
for corresponding ones of a plurality of scan positions in the defined aperture:
acquire, using the ultrasonic probe assembly, acoustic imaging data of the test object;
determine partial imaging result data using the acquired acoustic imaging data; and
generate complete imaging result data using the partial imaging results data from each scan position.

11. The ultrasound inspection system of claim 10, wherein the ultrasonic probe assembly includes a transmit probe and a receive probe, and wherein the transmit probe and receive probe are offset relative to a main imaging plane.

12. The ultrasound inspection system of claim 10, wherein the processor is configured to generate a three-dimensional (3D) image using the complete imaging result data.

13. The ultrasound inspection system of claim 10, wherein the processor configured to generate complete imaging result data using the partial imaging results data from each scan position is configured to:
generate a three-dimensional image in a main imaging plane, and
wherein the processor configured to determine the partial imaging result data using the acquired acoustic imaging data is configured to:
determine the partial imaging result data using corresponding imaging planes that are offset relative to the main imaging plane.

14. The ultrasound inspection system of claim 13, wherein the processor configured to determine the partial imaging result data using corresponding imaging planes that are offset relative to the main imaging plane is configured to:
apply a time-of-flight (TOF) delay to the partial imaging result data for each corresponding imaging plane.

15. The ultrasound inspection system of claim 10, wherein the ultrasonic probe assembly includes a spatial positioning system, and wherein the processor is configured to:
adjust, using the spatial positioning system, the position of the ultrasonic probe assembly using a fixed sequence of the scan positions.

16. The ultrasound inspection system of claim 10, wherein the processor configured to define the aperture for emulation using the synthetic aperture focusing technique is configured to:
define a number of acquisition steps and a size of the acquisition step.

17. The ultrasound inspection system of claim 10, wherein the acoustic imaging data includes full matrix capture (FMC) data.

18. The ultrasound inspection system of claim 10, wherein the partial imaging result data includes partial total focusing method (TFM) data, and wherein the complete imaging result data includes complete TFM data.

19. An ultrasound inspection system configured to detect a flaw in a test object and generate an image of the flaw, the system comprising:
an ultrasonic probe assembly having a linear transmit array and a linear receive array; and
a processor configured to:
define an aperture for emulation using a synthetic aperture focusing technique; and
for corresponding ones of a plurality of scan positions in the defined aperture:
acquire, using the ultrasonic probe assembly, full matrix capture (FMC) data of the test object;
determine partial total focusing method (TFM) data using the acquired acoustic imaging data; and
generate a TFM image using the partial TFM data from each scan position.

20. The ultrasound inspection system of claim 19, wherein the TFM is a three-dimensional (3D) image.

* * * * *